Nov. 18, 1924.  
A. SCHVARCZ  
FASTENER  
Filed July 14, 1922
1,516,462
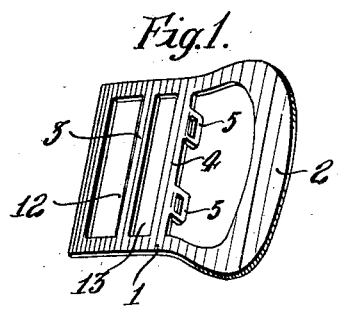
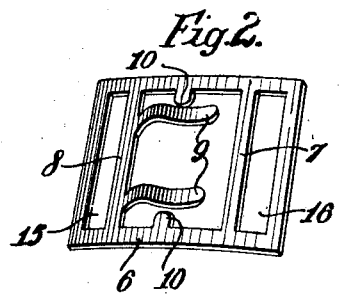
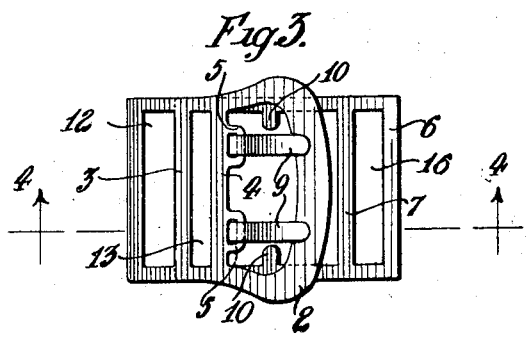
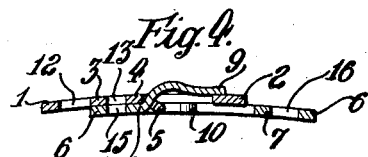
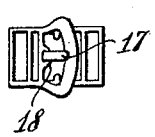
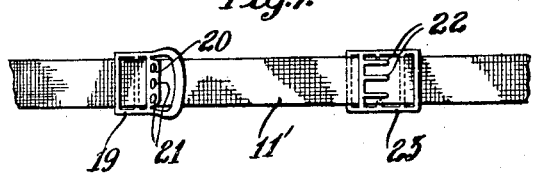
INVENTOR  
Andrew Schvarcz  
BY  
ATTORNEY Patented Nov. 18, 1924.

1,516,462

UNITED STATES PATENT OFFICE.

ANDREW SCHVARCZ, OF NEW YORK, N. Y., ASSIGNOR TO HUDSON JEWELRY MFG. CO., INC., OF NEW YORK, N. Y., A CORPORATION OF NEW JERSEY.

FASTENER.

Application filed July 14, 1922. Serial No. 574,993.

*To all whom it may concern:*

Be it known that I, ANDREW SCHVARCZ, a subject of Hungary, and resident of New York, in the county of New York and State of New York, have invented certain new and useful Improvements in Fasteners, of which the following is a specification.

This invention relates to fasteners in general and particularly to the kind employed in connection with flexible bands, chains, or the like.

The prime objects of my invention are to provide in connection with a flexible member, a fastening device composed of two individual parts adapted to securely interlock with each other when closed and to permit adjustment of the distance between the parts and relative to a continuous portion of said flexible member, so as to cause the portion between said parts to form a loop when these parts are locked together.

Another object of my invention is to provide in such fastener, anchoring male and female elements deflected from their respective bodies and in opposite direction to each other, and so arranged as to interlock when in operative position.

A still further object of my invention is to provide in connection with the fastener, means for adjustably attaching a flexible member and means for suspending said flexible member within the male portion of the fastener.

The foregoing and further objects will be more fuly apparent from the following description and the accompanying drawing forming a part of this specification, and in which:

Fig. represents the female part of a buckle.

Fig. 2 represents the male part thereof.

Fig. 3 shows the fastener in its interlocking position.

Fig. 4 is a sectional view taken on line 4—4 of Fig. 3.

Fig. 5 is a sectional view similar to that of Fig. 4 showing the attachment of a flexible member.

Fig. 6 is a modified form of my clasp in closed position.

Fig. 7 is another modified form of my clasp in open position and attached to a flexible member.

Referring to the drawings, numeral 1 denotes the outer frame of the female member, which is enlarged to form a buckle effect 2 at one end. The inner space of the buckle frame is divided by a transverse member 3 and another transverse member 4 from which extend perforated lugs 5 which are deflected downwardly relative to the body of the female member.

The male member illustrated in Fig. 2 is also composed of an outer frame 6 and divided by cross bars 7 and 8. From the latter extend upwardly prongs 9 adapted to engage the apertures of lugs 5 of the female member when the buckle is in locked position.

Between bars 7 and 8 there are provided supporting lugs 10, which serve to suspend a flexible member passing through the spaces between the bars of the male member, as will be explained later.

The enlarged portion 2 of the female member serves when prongs 9 have been slipped through lugs 5, to provide a rest for the ends of the prongs 9.

As may be seen in Fig. 5, a continuous portion of a flexible member 11, shown in broken lines, is associated with the female member of the fastener or buckle in such a manner as to pass through the opening 12, over and about bar 3, and through opening 13. From this point the flexible member forms a loop marked 14 and continues into the male member of the buckle through aperture 15, below bar 8, over the suspension lugs 10, over bar 7, through aperture 16, and below the opposite end of the frame of the male member, from which point it continues.

By adjusting the length of the loop the distance between the female and male members is determined. Employed as a wrist bracelet, the adjustment of the length of the loop permits the exact adjustment of the bracelet to the wrist, without necessitating a special adjusting member heretofore employed in connection with watch bracelets.

In Fig. 6 there is shown a buckle similar to that illustrated in Fig. 3, but provided with one central prong 17 and a corresponding lug 18. Otherwise the construction and operation are the same as that shown and described in Figs. 3 and 5.

Fig. 7 represents a buckle comprising male and female members provided with three anchoring means. The female member 19 is provided in this case with a lug 20 reaching over the entire width of the member and provided with a plurality of apertures 21, which latter register with the prongs 22 of the male member 23. The flexible member 11' is shown to be attached in a similar manner as illustrated in Fig. 5.

While the flexible member 11 and 11' in the Figs. 5 and 7, respectively, are shown to pass through the outer apertures 12 and 16 of the female and male members, be it understood that such flexible member may cover the outer end bars of the respective members, in which case the entire fastener is covered when closed, showing only the buckle portion and the anchoring members. The outer ends of the buckle parts in this case serve merely as extensions to facilitate the handling of my device, when closing or opening. This latter arangement is indicated in Figure 5 at 11''.

It is obvious that the anchoring members may not only vary in number, but also in shape, and I shall not be restricted to the design shown in the drawings, and I further reserve for myself the right to make such changes and improvements designed to simplify or beautify the construction of my device.

The employment of my device in connection with the wrist bracelets is only one of the many uses to which my invention may be put, as it is obvious that it may be employed in connection with any similar article of flexible nature, to attain the results of easy adjustment and securely locking together of such article.

Having thus described my invention, I claim:

1. A buckle, comprising male and female members, the former provided with an anchoring element extending from and beyond the plane of the body of said male member, said female member provided with means for receiving said anchoring element and a bearing member for the latter, said anchoring element adapted to pass through said receiving means and rest with its ends against said bearing member, thus causing said male and female members to interlock.

2. A buckle, comprising interlocking male and female members, the former provided with at least one prong extending from and beyond the plane of the body of said male member, said female member provided with at least one prong receiving element and a rest bar for said prong, said prong, said element and said bar adapted to co-operate and interlock with each other when said male and female members are in closed position.

3. A buckle, comprising interlocking male and female members, the former provided with a plurality of prongs extending from and beyond the plane of the body of said male member, a plurality of prong receiving means provided at and deflected from the body of said female member, a prong rest formed at the female member, said prongs, said receiving means and said prong rest adapted to interlock when the buckle is in closed position.

4. In a buckle, frame-like male and female members adapted to be individually associated with a flexible element, said male member provided with a male anchoring element, and prong-like means for supporting said flexible element arranged within the frame of said male member, said female member having a female anchoring element, said anchoring elements extending from within the frames of their respective members and being deflected in opposite directions relative to each other.

5. In combination with a flexible element, a buckle comprising frame-like male and female members, each having anchoring elements extending from within the frames of their respective members and deflected in opposite directions relative to each other, means provided at each member for receiving said flexible element and adapted to permit the latter's adjustment relative to each individual member, and prong-like means provided at and extending inwards of said male member for supporting said flexible element and preventing it from dislocation relative to said male member.

6. In combination with a flexible member, a buckle comprising male and female members of frame-like structure and adapted to be associated with said flexible member and spaced from each other at a desired distance, said male and female members having means for receiving said flexible member, said receiving means permitting the adjustment of said male and female members upon said flexible member and relative to each other, said male member having oppositely disposed prong-like supporting means for said flexible member projecting into the space formed by its frame-like structure.

Signed at New York, in the county of New York and State of New York, this 20 day of June, A. D. 1922.

ANDREW SCHVARCZ.